United States Patent
Liu et al.

(10) Patent No.: US 11,557,317 B2
(45) Date of Patent: *Jan. 17, 2023

(54) READ HEAD SENSOR WITH BALANCED SHIELD DESIGN

(71) Applicant: Western Digital Technologies, Inc., San Jose, CA (US)

(72) Inventors: Xiaoyong Liu, San Jose, CA (US); Goncalo Baiao De Albuquerque, San Jose, CA (US); Daniele Mauri, San Jose, CA (US); Yukimasa Okada, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,167

(22) Filed: Sep. 20, 2021

(65) Prior Publication Data

US 2022/0028418 A1 Jan. 27, 2022

Related U.S. Application Data

(62) Division of application No. 16/909,785, filed on Jun. 23, 2020, now Pat. No. 11,170,807.

(51) Int. Cl.
*G11B 5/39* (2006.01)

(52) U.S. Cl.
CPC .......... *G11B 5/3912* (2013.01); *G11B 5/3932* (2013.01)

(58) Field of Classification Search
None
See application file for complete search history.

(56) References Cited

U.S. PATENT DOCUMENTS

| | | | | |
|---|---|---|---|---|
| 4,918,554 A | * | 4/1990 | Bajorek et al. | G11B 5/3903 360/319 |
| 6,118,621 A | * | 9/2000 | Ohsawa et al. | G11B 5/3903 360/322 |
| 6,292,334 B1 | * | 9/2001 | Koike et al. | G11B 5/3903 360/319 |
| 7,656,619 B1 | | 2/2010 | Yan et al. | |
| 7,782,574 B1 | | 8/2010 | Benakli et al. | |
| 9,293,160 B1 | * | 3/2016 | Mihajlovic et al. | G11B 5/37 |
| 9,472,216 B1 | | 10/2016 | Mauri et al. | |
| 10,074,387 B1 | * | 9/2018 | Xiao et al. | G11B 5/3912 |
| 10,991,390 B2 | | 4/2021 | Kobayashi | |
| 11,170,807 B1 | * | 11/2021 | Liu et al. | G11B 5/3912 |

(Continued)

FOREIGN PATENT DOCUMENTS

| | | |
|---|---|---|
| JP | 2927285 B1 | 7/1999 |
| JP | 2002170210 A | 6/2002 |
| JP | 2007004985 A | 1/2007 |

*Primary Examiner* — Craig A. Renner
(74) *Attorney, Agent, or Firm* — Patterson & Sheridan, LLP; Steven H. VerSteeg (57) ABSTRACT

The present disclosure generally relates to a read head of a data storage device. The read head includes a read sensor sandwiched between two shields. The shields can have different materials as well as a different number of layers. Furthermore the shields can be fabricated by different processes and have different heights and thicknesses. The ratio of the thickness to the height for the shields are substantially identical to ensure that the saturation field are substantially identical and balanced.

20 Claims, 9 Drawing Sheets

(56) References Cited

U.S. PATENT DOCUMENTS

| | | | |
|---|---|---|---|
| 2004/0156148 A1* | 8/2004 | Chang et al. | G11B 5/3903 360/319 |
| 2005/0201018 A1* | 9/2005 | Nagai et al. | G11B 5/3912 360/322 |
| 2007/0201166 A1* | 8/2007 | Gill | G11B 5/3912 360/319 |
| 2010/0027168 A1* | 2/2010 | Chou et al. | G11B 5/3912 360/319 |
| 2010/0067148 A1* | 3/2010 | Tsuchiya et al. | G11B 5/3912 360/319 |
| 2010/0103562 A1* | 4/2010 | Machita et al. | G11B 5/3912 360/313 |
| 2010/0103563 A1* | 4/2010 | Machita et al. | G11B 5/3912 360/319 |
| 2010/0149689 A1* | 6/2010 | Tsuchiya et al. | G11B 5/3912 360/313 |
| 2010/0163519 A1* | 7/2010 | Ayukawa et al. | G11B 5/3163 216/22 |
| 2011/0069417 A1* | 3/2011 | Kawamori et al. | G11B 5/3912 360/319 |
| 2011/0279923 A1* | 11/2011 | Miyauchi et al. | G11B 5/3912 360/319 |
| 2011/0310513 A1* | 12/2011 | Dimitrov et al. | G11B 5/3912 360/319 |
| 2013/0149559 A1 | 6/2013 | Covington et al. | |
| 2014/0120374 A1* | 5/2014 | Zhu et al. | G11B 5/3912 428/811.3 |
| 2014/0218821 A1* | 8/2014 | Lu et al. | G11B 5/3912 360/110 |
| 2017/0154642 A1 | 6/2017 | Biskebom et al. | |
| 2017/0256276 A1 | 9/2017 | Hiraki et al. | |
| 2018/0144768 A1 | 5/2018 | Liu et al. | |

* cited by examiner

READ HEAD SENSOR WITH BALANCED SHIELD DESIGN

CROSS-REFERENCE TO RELATED APPLICATIONS

This application is a divisional of co-pending U.S. patent application Ser. No. 16/909,785, filed Jun. 23, 2020, which is herein incorporated by reference.

BACKGROUND OF THE DISCLOSURE

Field of the Disclosure

Embodiments of the present disclosure generally relate to a read head of a data storage device.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track are narrowed. Attempts to achieve increasing requirements of advanced narrow gap reader sensors of read heads to achieve reading of higher recording densities have been proposed utilizing magnetoresistive sensors with free layers comprised of high saturation magnetization materials.

Typical read heads include a read sensor sandwiched between two shields. Obtaining a balanced saturation field of shields for a read head can be challenging as the shields are not always identical which can create an unbalanced out of plane magnetic field.

Therefore, there is a need in the art for an improved magnetic read head.

SUMMARY OF THE DISCLOSURE

The present disclosure generally relates to a read head of a data storage device. The read head includes a read sensor sandwiched between two shields. The shields can have different materials as well as a different number of layers. Furthermore the shields can be fabricated by different processes and have different heights and thicknesses. The ratio of the thickness to the height for the shields are substantially identical to ensure that the saturation field of individual shields are substantially identical and balanced.

In one embodiment, a magnetic read head comprises: a first shield, the first shield having a first thickness and a first height; a sensor disposed on the first shield; and a second shield disposed on the sensor, wherein the second shield has a second thickness and a second height, wherein the first thickness and the second thickness are different, and wherein a ratio of the first thickness to the first height is substantially identical to a ratio of the second thickness to the second height.

In another embodiment, a magnetic read head comprises: a first shield, wherein the first shield comprises a single layer; a sensor disposed on the first shield; and a second shield disposed on the sensor, wherein the second shield comprises a plurality of layers, and wherein the first shield and the second shield have substantially identical magnetic saturation fields.

In another embodiment, a magnetic read head comprises: a first shield comprising a single, first layer, wherein the first layer has a first thickness and a first height; a sensor disposed on the first shield, wherein the sensor is a dual free layer sensor; and a second shield disposed on the sensor, wherein the second shield comprises a plurality of layers, wherein the plurality of layers has a second thickness and a second height, and wherein the first thickness is different from the second thickness, and wherein a ratio of the first thickness to the first height is substantially identical to a ratio of the second thickness to the second height.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s). Usage in the Summary of the Disclosure or in the Detailed Description of the term "comprising" shall mean comprising, consisting essentially, and/or consisting of.

The present disclosure generally relates to a read head of a data storage device. The read head includes a read sensor sandwiched between two shields. The shields can have different materials as well as a different number of layers. Furthermore the shields can be fabricated by different processes and have different heights and thicknesses. The ratio of the thickness to the height for the shields are substantially identical to ensure that the saturation field are substantially identical and balanced.

Figure 1:
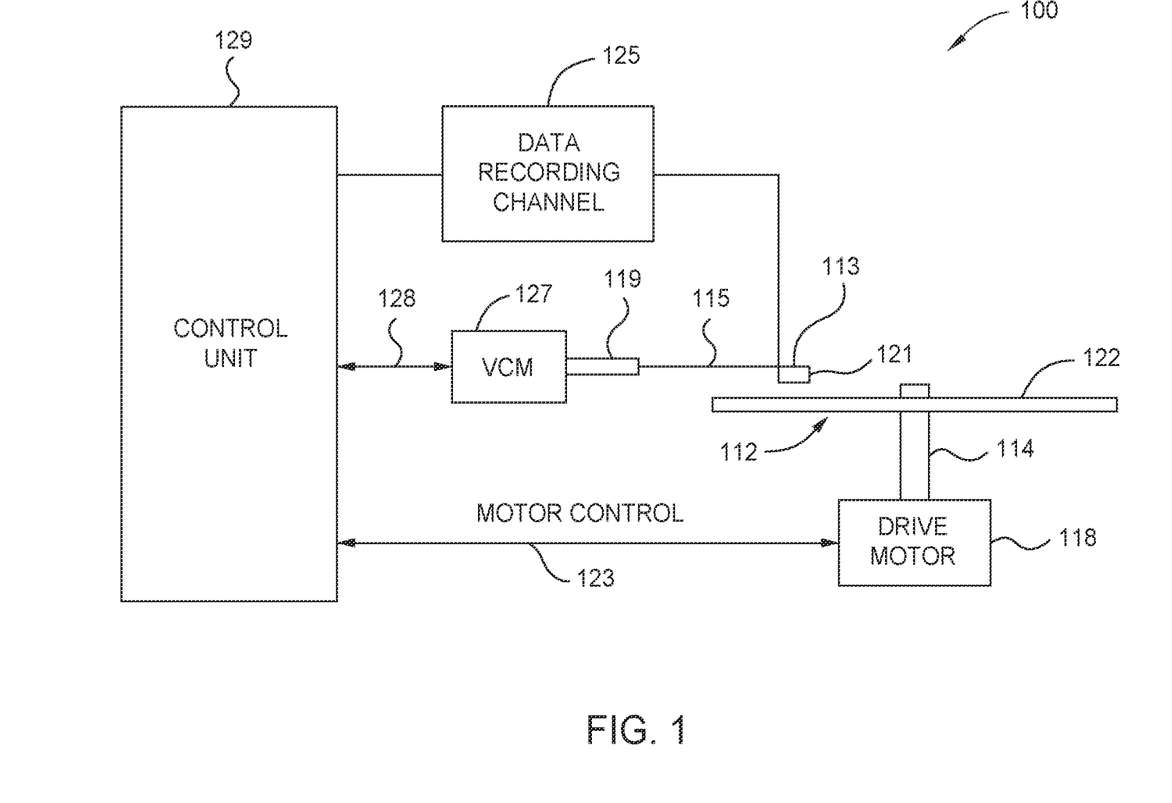
FIG. 1 is a schematic illustration of certain embodiments of a magnetic media drive including a magnetic read head.

FIG. 1 is a schematic illustration of certain embodiments of a magnetic media drive 100 including a magnetic write head and a magnetic read head. The magnetic media drive 100 may be a single drive/device or comprise multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one embodiment. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and such as a read head comprising a TMR device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
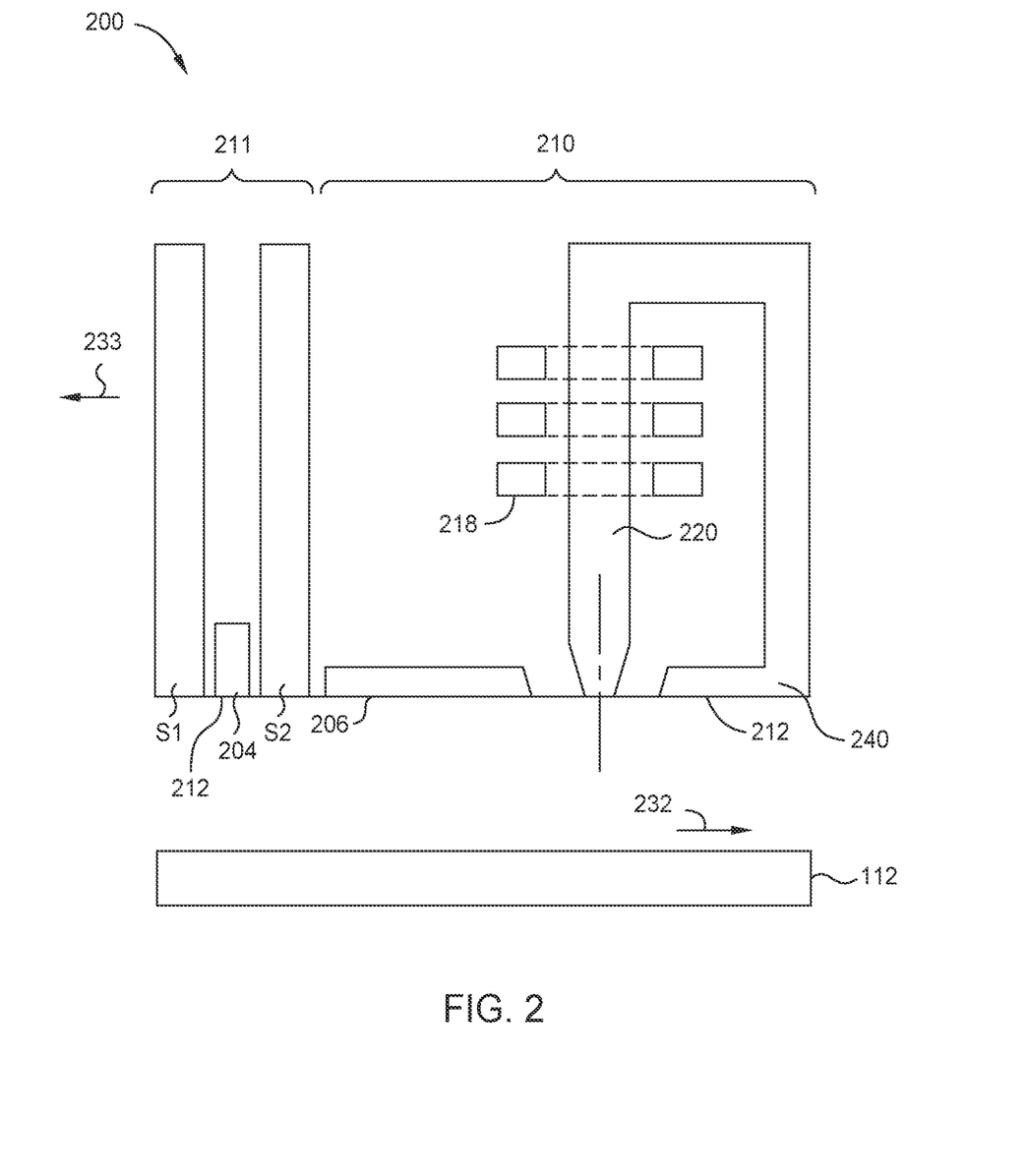
FIG. 2 is a schematic illustration of certain embodiments of a cross sectional side view of a head assembly facing a magnetic storage medium.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 include a sensing element 204 disposed between shields S1 and S2. The sensing element 204 and the shields S1 and S2 having a MFS 212 facing the magnetic disk 112. The sensing element 204 is a TMR device sensing the magnetic fields of the recorded bits, such as perpendicular recorded bits or longitudinal recorded bits, in the magnetic disk 112 by a TMR effect. In certain embodiments, the spacing between shields S1 and S2 is about 17 nm or less.

The head assembly 200 may optionally include a write head 210. The write head 210 includes a main pole 220, a leading shield 206, and a trailing shield (TS) 240. The main pole 220 comprises a magnetic material and serves as a main electrode. Each of the main pole 220, the leading shield 206, and the trailing shield (TS) 240 has a front portion at the MFS. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The TS 240 comprises a magnetic material, serving as a return pole for the main pole 220. The leading shield 206 may provide electromagnetic shielding and is separated from the main pole 220 by a leading gap 254.

Figure 3A:
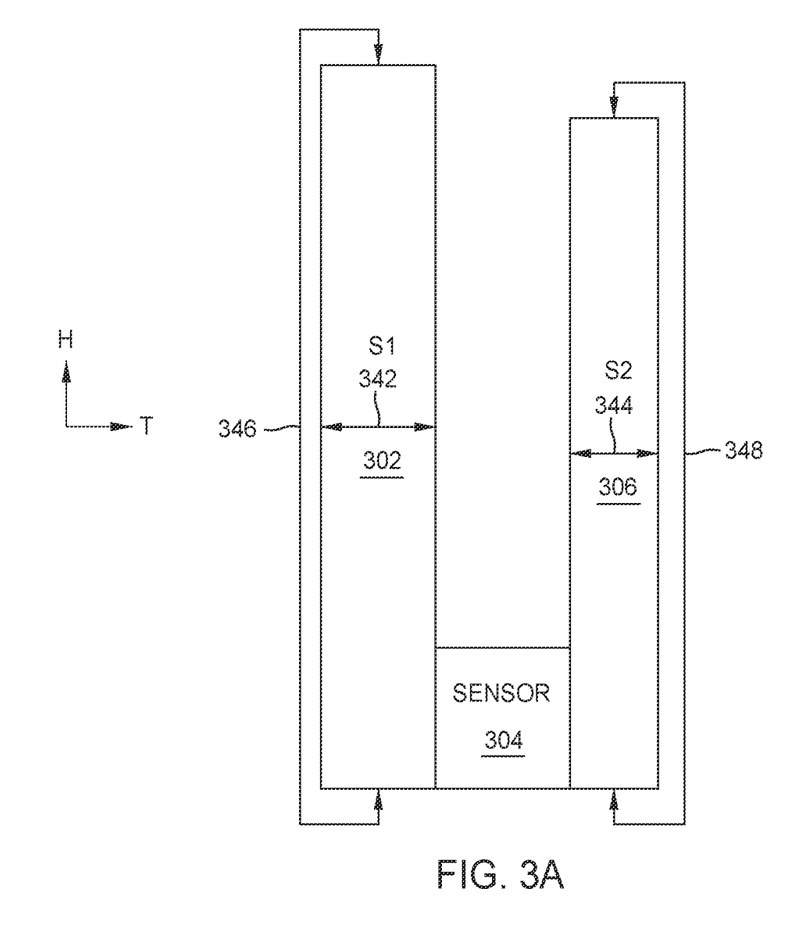
FIGS. 3A and 3B are schematic illustrations of read heads having shields with different heights and thicknesses according to embodiments discussed herein.
Figure 3B:
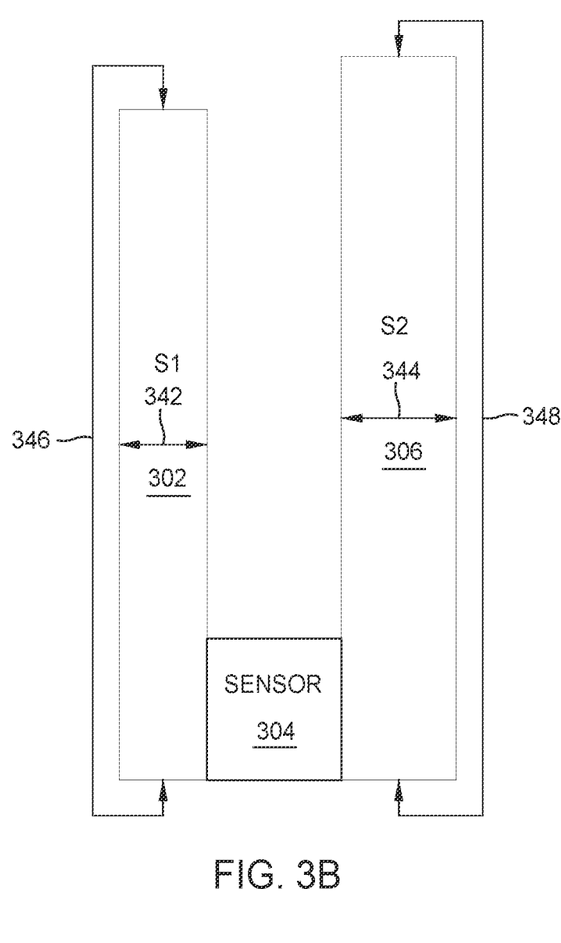
Figure 3C:
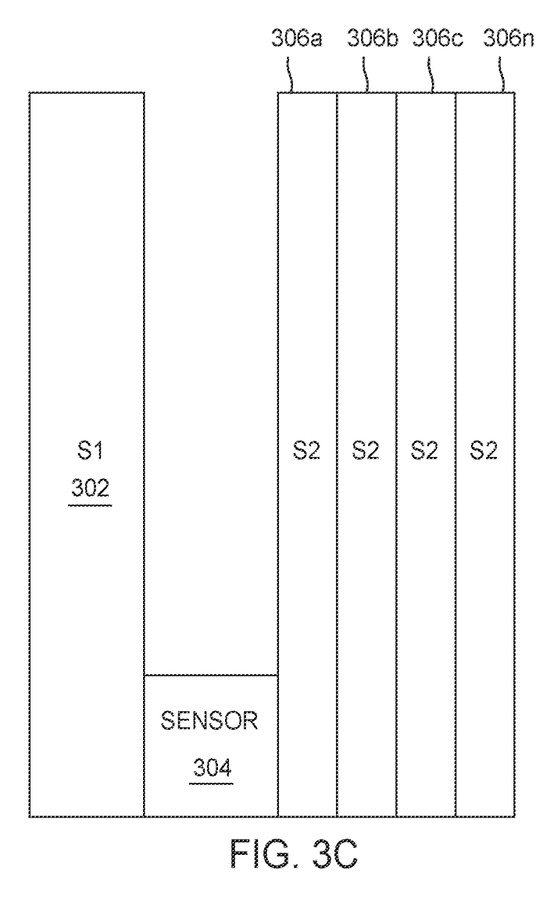
FIGS. 3C-3E are schematic illustrations of read heads having shields with different layers according to embodiments discussed herein.
Figure 3D:
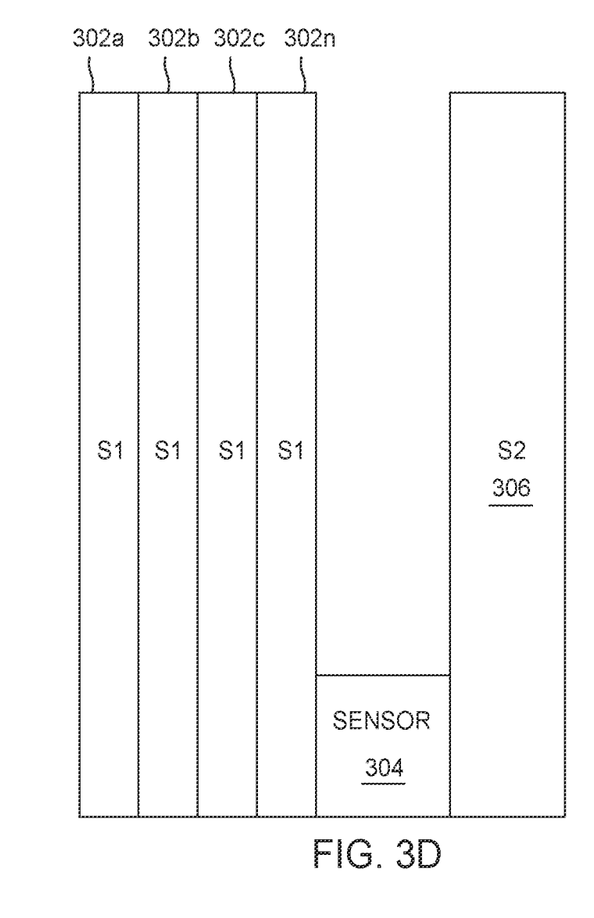
Figure 3E:
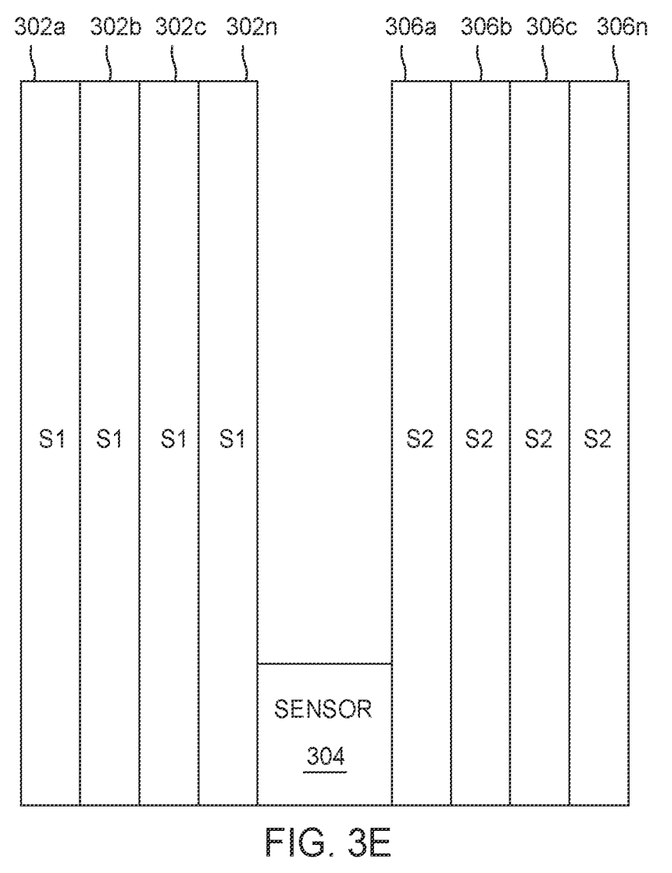
Figure 3F:
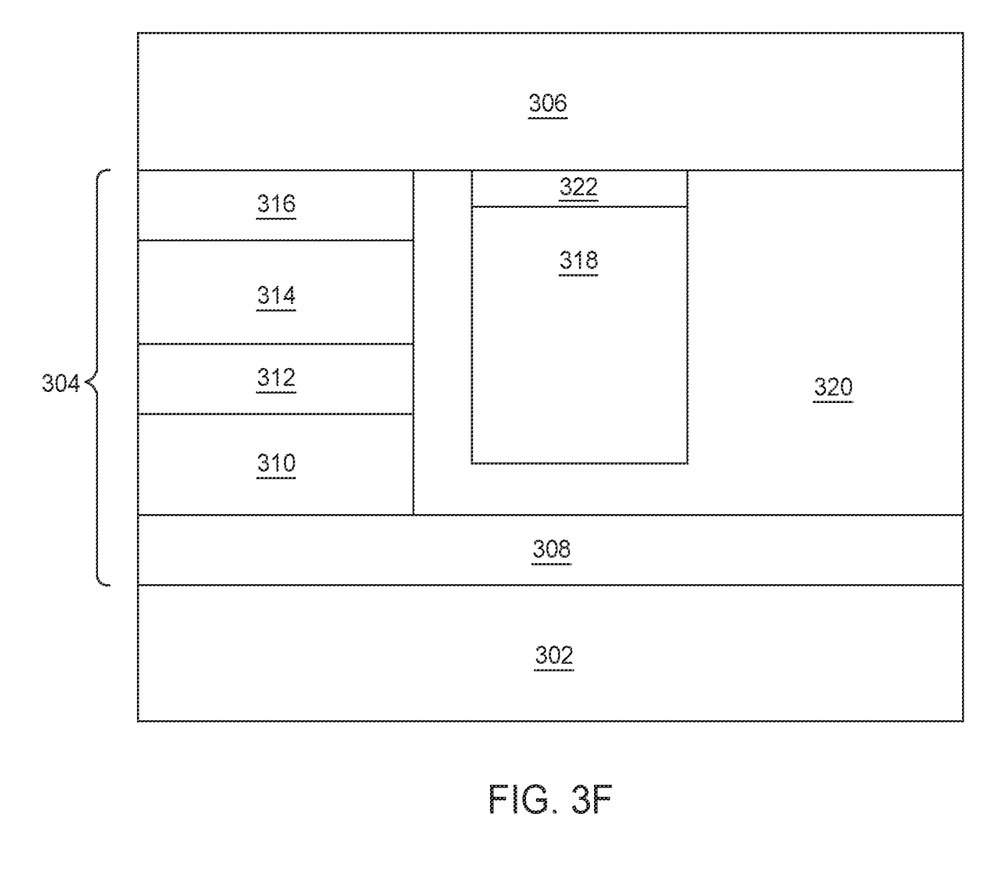
FIG. 3F is a schematic illustration of a read head having a dual free layer sensor according to one embodiment.
Figure 3G:
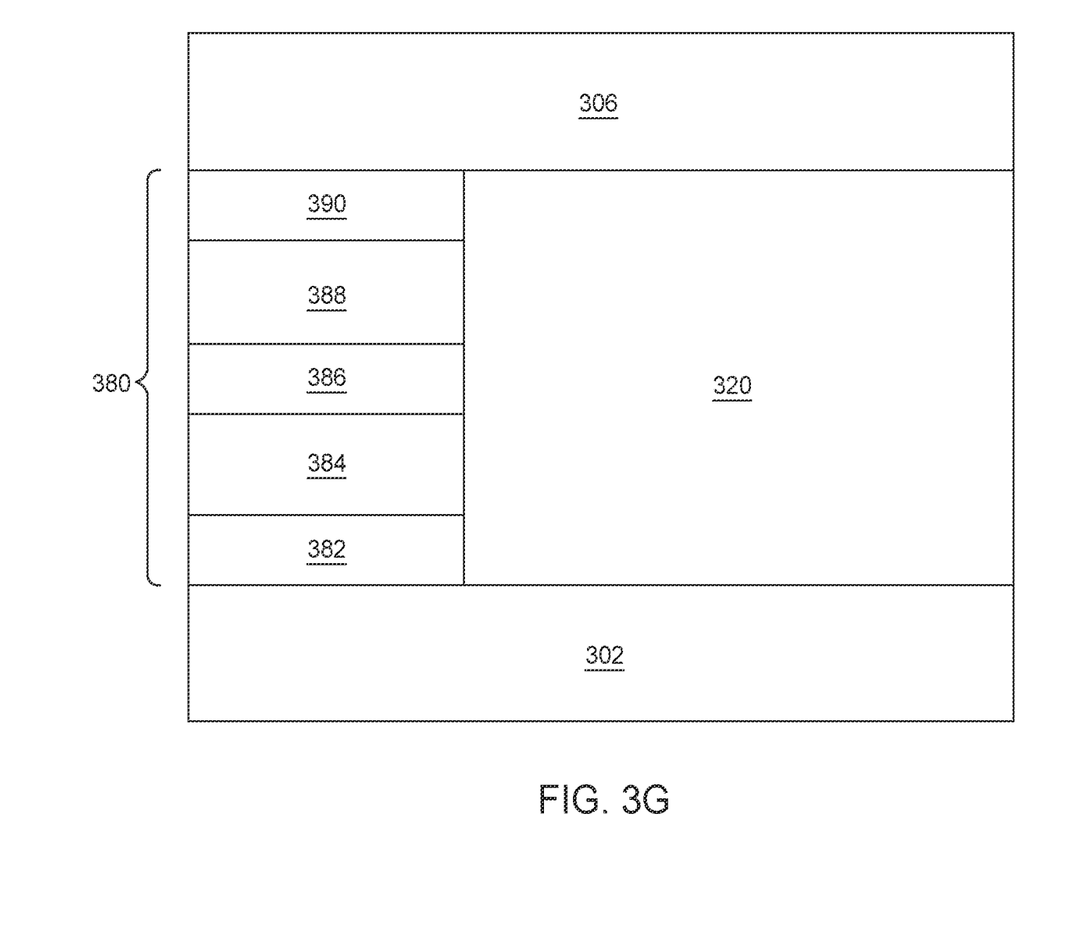
FIG. 3G is a schematic illustration of a read head having a single free layer sensor according to one embodiment.

FIGS. 3A and 3B are schematic illustrations of read heads having shields with different heights and thicknesses according to embodiments discussed herein. FIGS. 3C-3E are schematic illustrations of read heads having shields with different layers according to embodiments discussed herein. FIG. 3F is a schematic illustration of a read head having a dual free layer sensor according to one embodiment. FIG. 3G is a schematic illustration of a read head having a single fee layer sensor according to one embodiment. The read heads of FIG. 3A-3G include a first shield (S1) 302, a sensor 304 disposed on the S1 302, and a second shield (S2) 306 disposed on the sensor 304.

In FIGS. 3A and 3B, the S1 302 has a first thickness and a first height and the S2 306 has a second thickness and a second height. The first thickness 342 of the S1 302 and the second thickness 344 of the S2 306 each has a thickness of about 0.1 microns to about 2 microns. Furthermore, the first height 346 of the S1 302 and the second height 348 of the S2 306 each has a height of about 10 microns to about 20 microns. The previous ranges of values listed for the thickness and the height of the S1 and the S2 is not intended to be limiting, but to provide an example of possible embodiments. In one embodiment, the first thickness is not equal to the second thickness, and the first height is not equal to the second height.

If the first height 346 of S1 302 is about 20 microns, the second height 348 of S2 306 is about 10 microns, the first thickness 342 of S1 302 is about 2 microns, and the second thickness 344 of S2 306 is about 1 microns, then the ratio of the first thickness 342 of S1 302 to the first height 346 of S1 302 is about 2:20 or about 0.1 and the ratio of the second thickness 344 of S2 306 to the second height 348 of S2 306 is about 1:10 or about 0.1. If the first height 346 of S1 302 is about 10 microns, the second height 348 of S2 306 is about 20 microns, the first thickness 342 of S1 302 is about 1 microns, and the second thickness 344 of S2 306 is about 2 microns, then the ratio of the thickness of S1 302 to the height of S1 302 is about 1:10 or about 0.1 and the ratio of the thickness of S2 306 to the height of S2 306 is about 2:20 or about 0.1.

The saturation field of each individual shield, S1 302 and S2 306, is proportional to the product of Ms (i.e., magnetic moment) of the respective shield times the ratio of the respective shield thickness to the respective shield height. Though the S1 302 and the S2 306 may each include different compositions of the materials previously mentioned, the saturation field of the S1 and the S2 are substantially identical due to the relationship between the product of the first shield Ms times the ratio of the first thickness 342 to the first height 346 of the S1 302 and product of the second shield Ms times the ratio of the second thickness 344 to the second height 348 of the S2 306. Likewise, the out of plane magnetic fields (seen by reader) from the S1 302 and the S2 306 are substantially cancelled due to the relationship between the product of the first shield Ms times the ratio of the first thickness 342 to the first height 346 of the S1 302 and the product of the second shield Ms times the ratio of the second thickness 344 to the second height 348 of the S2 306.

The ratio of the first thickness 342 to the first height 346 of the S1 302 is equal to or substantially identical to the ratio of the second thickness 344 to the second height 348 of the S2 306, such that the equation, $Ms_1 T_1 / H_1 = Ms_2 T_2 / H_2$ is satisfied. For example, for the same shield material, which implies the same Ms, if the first thickness 342 is equal to about 1 micron and the first height 346 is equal to about 10 microns, the ratio of the first thickness 342 to the first height 346 is about 1:10 or about 0.1. Therefore, in order for the ratio of the second thickness 344 to the second height 348 to be equal to or substantially identical to the ratio of the first thickness 342 to the first height 346, the second thickness 344 and the second height 348 should satisfy the following equations: $T_2 = 0.1 * H_2$ or $H_2 = T_2 / 0.1$, where $T_2$ refers to the second thickness 344 and $H_2$ refers to the second height 348.

The S1 302 and the S2 306 include materials selected from the group that includes amorphous magnetic alloys, such as nickel (Ni), iron (Fe), cobalt (Co), chromium (Cr), zirconium (Zr), niobium (Nb), hafnium (Hf), and combinations thereof. In one embodiment, the Ms of the shielding material is the same in S1 302 and S2 306. In another embodiment, the Ms of the shielding material has over 100% difference in magnitude as between that of S1 and S2. The S1 302 and the S2 306 may each be formed through a first method or through different methods, such as a first method to form S1 302 and a second method to form S2 306. Methods to form the S1 302 and the S2 306 include chemical vapor deposition (CVD), atomic layer deposition (ALD), physical vapor deposition (PVD), electroplating, and the other methods appropriate to forming a shield.

FIG. 3C is a schematic illustration of a read head including a S1 302, a sensor 304 disposed on the S1 302, and a plurality of S2 layers 306a-306n, with n representing 4 or more, where a first S2 layer 306a is disposed on the sensor 304 and each subsequent S2 layer 306b-306n is disposed on the previous S2 layer 306b-306n. As shown in FIG. 3C, the second S2 layer 306b is disposed on the first S2 layer 306a, the third S2 layer 306c is disposed on the second S2 layer 306b, and so-forth. The S1 302 may be formed by a first method that includes a first material. Furthermore, each of the one or more S2 layers 306a-306n may be formed by a second method that is different from the first method of the S1 302 that includes a second material that is different from the first material. The materials and methods of forming each shield of a read head include the previously listed methods and materials applicable to the shield of a read head. Furthermore, each layer of the one or more S2 layers 306a-306n may comprise identical or different materials and be formed by identical or different methods.

FIG. 3D is a schematic illustration of a read head including a plurality of S1 302a-302n, with n representing 4 or more, a sensor 304 disposed on the plurality of S1 302a-302n, and a S2 layer 306, where the last S1 layer 302n is disposed adjacent to and in contact with the sensor 304. As shown in FIG. 3D, the second S1 layer 302b is disposed on the first S1 layer 302a, the third S1 layer 302c is disposed on the second S1 layer 302b, and so forth. The S2 306 may be formed by a first method that includes a first material. Furthermore, each of the one or more S1 layers 302a-302n may be formed by a second method that is different from the first method of the S2 306 that includes a second material that is different from the first material. The materials and methods of forming each shield of a read head include the previously listed methods and materials applicable to the shield of a read head. Furthermore, each layer of the one or more S1 layers 302a-302n may comprise identical or different materials and be formed by identical or different methods.

FIG. 3E is a schematic illustration of a read head including a plurality of S1 302a-302n, with n representing 4 or more, a sensor 304 disposed on the plurality of S1 302a-302n, and a plurality of S2 306a-306n (with n representing 4 or more) disposed on the sensor 304. As shown in FIG. 3E, the second S1 layer 302b is disposed on the first S1 layer 302a, the third S1 layer 302c is disposed on the second S1 layer 302b, and so forth. Additionally as shown in FIG. 3E, a first S2 layer 306a is disposed on the sensor 304 and each subsequent S2 layer 306b-306n is disposed on the previous S2 layer 306b-306n such that the second S2 layer 306b is disposed on the first S2 layer 306a, the third S2 layer 306c is disposed on the second S2 layer 306b, and so forth.

Each of the one or more S1 layers 302a-302n may be formed by a first method that is different from the second method of forming the one or more S2 layers 306a-306n. Furthermore, the materials for the one or more S1 layers 302a-302n may comprise a first material that is different from a second material that comprises the one or more S2 layers 306a-306n. Additionally, the different layers of S1 302a-302n may comprise different materials. Similarly, the different layers of S2 306a-306n may comprise different materials. The materials and methods of forming each shield of a read head include the previously listed methods and materials applicable to the shield of a read head. Furthermore, each layer of the one or more S1 layers 302a-302n and the one or more S2 layers 306a-306n may comprise identical or different materials and be formed by identical or different methods.

FIG. 3F is a schematic illustration of a read head, according to one embodiment, including a first shield (S1) 302, a dual free layer (DFL) sensor 304, a second shield (S2) 306, an insulation 320, a rear hard bias (RHB) 318, and a nonmagnetic layer 322. The sensor 304 includes a seed layer 308, a first free layer (FL) 310, a barrier layer (such as MgO) 312, a second FL 314, and a cap layer 316. Because the sensor 304 includes two FLs 310, 314, the sensor 304 may be considered a dual free layer (DFL) sensor. The sensor 304 may be a magnetic tunnel junction (MTJ) stack and may be formed using PVD sputtering, IBD, and other well-known deposition methods. The seed layer 308 includes a material selected from the group that includes tantalum (Ta), tungsten (W), Ru, Cr, Co, Ti, Hf, and combinations thereof. The cap layer 316 may be Ta, Ru, Cr, Ti, Hf or any other suitable cap material. The insulation 320 may be MgO, aluminum oxide (AlOx), SiN or any other suitable insulation material. Free layers may each include Ni, Fe, Co, boron, Hf or combinations thereof. The rear hard bias (RHB) 318 may include cobalt platinum (CoPt) or CoCrPt with high coercivity sitting on an appropriate seed layer to generate a magnetic field that acts on the sensor 304. Furthermore, a nonmagnetic layer 322 separates the RHB 318 from the S2 306, such that the RHB 318 is not in contact with the S2 306.

FIG. 3G is a schematic illustration of a read head having a single free layer sensor according to one embodiment. The read head includes a first shield (S1) 302, a sensor 380, a second shield (S2) 306, and an insulation 320. The sensor 380 includes a seed layer 382, a fixed magnetic layer 384, a barrier layer 386, a free layer (FL) 388, and a cap layer 390. The sensor 380 is a magnetic tunnel junction (MTJ) stack and may be formed using PVD sputtering, IBD, and other well-known deposition methods. The seed layer 382 includes a material selected from the group that includes tantalum (Ta), tungsten (W), Ru, Cr, Co, Ti, and combinations thereof. The cap layer 390 may be Ta, Ru, Cr, Ti, Hf or any other suitable cap material. The barrier layer 386 may be MgO, aluminum oxide (AlOx) or any other suitable insulation material. The free layer 388 and the fixed layer 384 include Ni, Fe, Co, boron, Hf or combinations thereof.

To this point, the examples have assumed that S1 and S2 have the same Ms, yet different heights and thicknesses such that the ratio of $Ms_1T_1/H_1=Ms2T_2/H_2$. However, it is to be understood that S1 and S2 may have different materials (hence different Ms) as well as different thicknesses and heights, yet still satisfy the equation $Ms_1T_1/H_1=Ms2T_2/H_2$.

Figure 4:
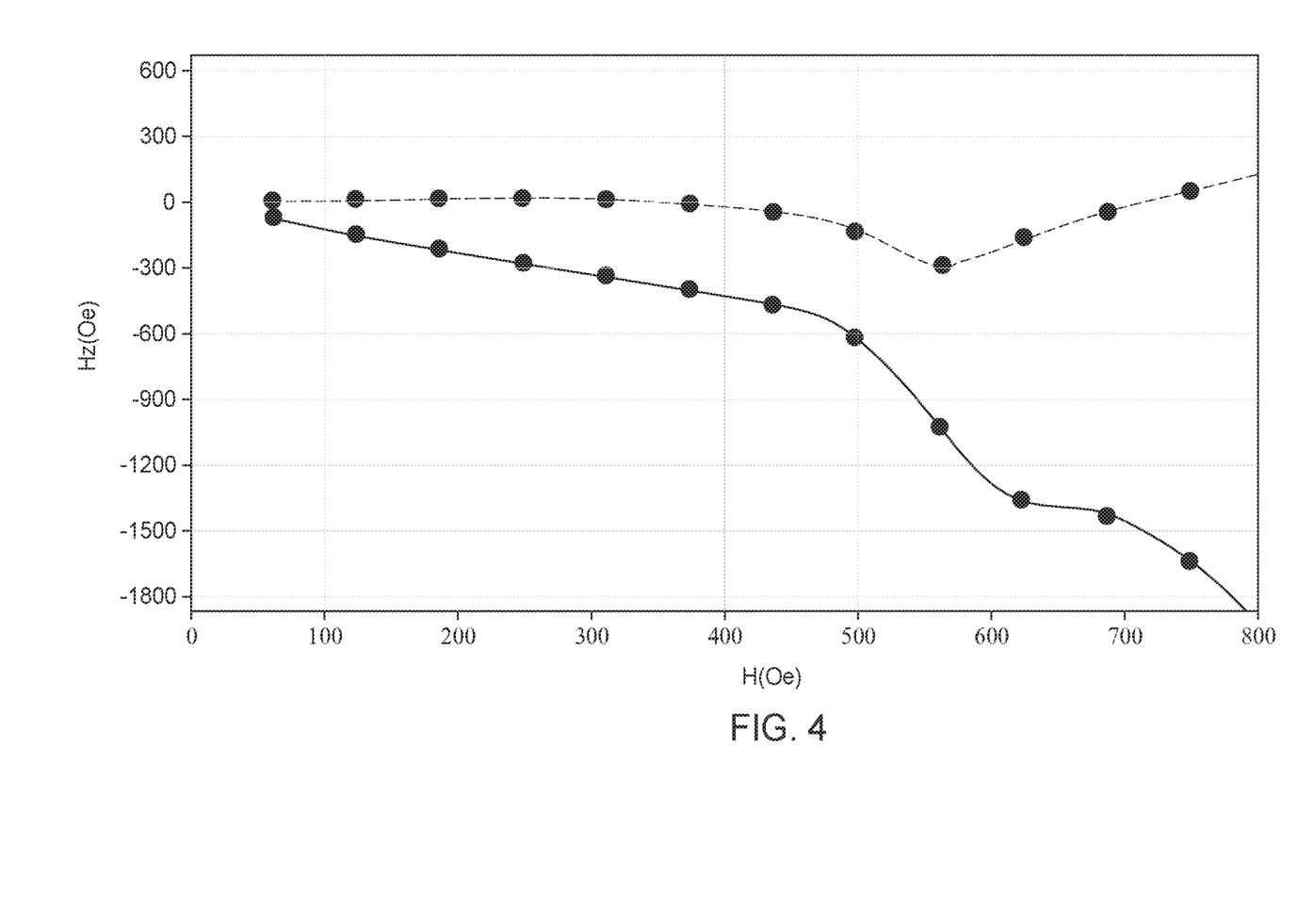
FIG. 4 is a graph illustrating a linearity improvement according to embodiments discussed herein.

FIG. 4 is a graph illustrating a reader linearity improvement according to embodiments discussed herein. The applied field, H (Oe), is graphed on the x-axis and the net out-of-plane field from shield, seen by sensor Hz (Oe), is graphed on the y-axis. The solid line is the base case where both S1 and S2 have the same Ms, where the ratio of the thickness to the height of the first shield, such as S1 302, and ratio of the thickness to the height of the second shield, such as S2 306, are not substantially identical. The dotted line case has the Ms of the first shield times the ratio of the thickness to the height of the first shield identical to the Ms of the second shield times the ratio of the thickness to the height of the second shield. Further, the first shield height is equal to the second shield height in the dotted line case. Because the ratio of the thickness to the height of each shield is substantially identical and because the Ms are the same for both shields, the out-of-plane fields are effectively canceled (e.g., closer to 0 on the y-axis), resulting in a more linearized and improved sensor transfer curve and a smaller asymmetrical standard deviation.

Figure 5:
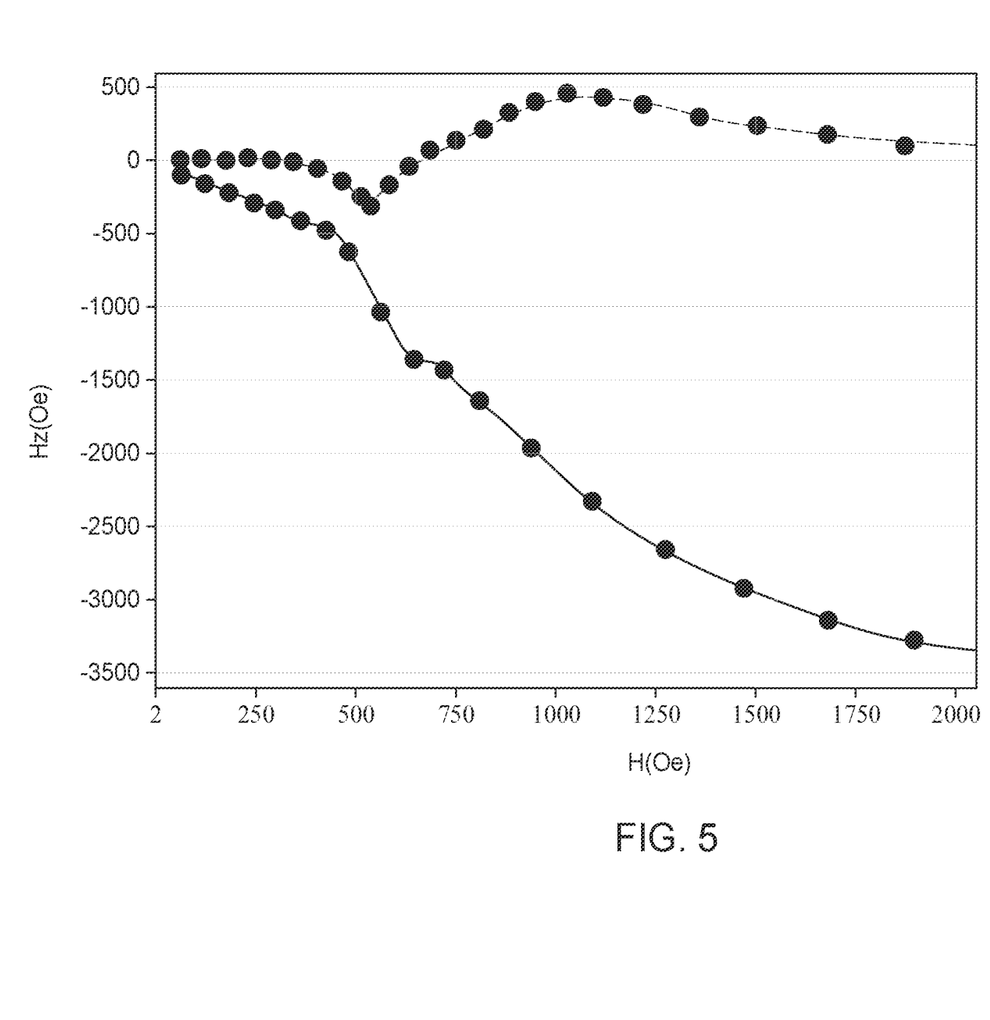
FIG. 5 is a graph illustrating disturbance to a rear hard bias (RHB) structure and transfer curve flip according to embodiments discussed herein.

FIG. 5 is a graph illustrating disturbance to a rear hard bias (RHB) structure in the case where a DFL sensor is implemented and transfer curve flip according to embodiments discussed herein. The transverse field, H(Oe), is graphed on the x-axis and the out-of-plane field, Hz (Oe), is graphed on the y-axis. The solid line is the base case, where the ratio of the thickness to the height of the first shield, such as S1 302, and ratio of the thickness to the height of the second shield, such as S2 306, are not substantially identical. The dotted line case has the Ms of the first shield times the ratio of the thickness to the height of the first shield substantially identical to the Ms of the second shield times the ratio of the thickness to the height of the second shield. Moreover, the first shield height is equal to the second shield height of the dotted line case. A typical DFL design usually includes a RHB, such as RHB 318 of FIG. 3F. The uncancelled out-of-plane fields generated by the opposing shields (e.g., a first shield and a second shield) may have a negative effect (e.g., a polarity flip), if they are closer or larger than the coercivity of the RHB, and may: (1) disturb magnetization of RHB, and (2) in an extreme case, flip the RHB direction, resulting in polarity flip of sensor transfer curve.

Because the Ms of the shield times the ratio of the thickness to the height of each shield is substantially identical, the out-of-plane fields are effectively cancelled or minimized (e.g., closer to 0 on the y-axis), resulting in little or no impact on RHB and no polarity flip of the sensor and improved sensor performance.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending United States patent application entitled "Tape Embedded Drive", application Ser. No. 16/365,034, filed on Mar. 31, 2019 and assigned to the same assignee of the instant application, which is incorporated by reference herein. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

In one embodiment, a magnetic read head comprises: a first shield, the first shield having a first thickness and a first height; a sensor disposed on the first shield; and a second shield disposed on the sensor, wherein the second shield has a second thickness and a second height, wherein the first thickness and the second thickness are different, and wherein a ratio of the first thickness to the first height is substantially identical to a ratio of the second thickness to the second height. Both the first thickness and the second thickness are between about 0.5 microns and about 2 microns. Both the first height and the second height are between about 10 microns and about 20 microns. The sensor comprises a dual free layer sensor. The first shield and the second shield have substantially identical Ms. The first shield and the second shield have different values for Ms, and wherein Ms for the first shield times the first thickness divided by the first height equals Ms for the second shield times the second thickness divided by the second height. A magnetic media drive comprising the magnetic read head is also disclosed.

In another embodiment, a magnetic read head comprises: a first shield, wherein the first shield comprises one or more first shield layers; a sensor disposed on the first shield; and a second shield disposed on the first shield, wherein the second shield comprises one or more second shield layers, wherein one or more of the first shield and the second shield comprises a plurality of layers, and wherein the first shield and the second shield have substantially identical magnetic saturation fields. The sensor is a single free layer sensor. At least one layer of the plurality of layers of the second shield is formed by a method that is different from a method used to form the first shield. The first shield comprises a first material, wherein the second shield comprises a second material that is different from the first material. The first shield has a first thickness and first height, wherein the second shield has a second thickness and a second height, and wherein the first height is different from the second height. A ratio of the first thickness to the first height is substantially identical to a ratio of the second thickness to the second height. The magnetic read head further comprises a magnetic hard bias structure disposed between the first shield and the second shield. A magnetic media drive comprising the magnetic read head is also disclosed.

In another embodiment, a magnetic read head comprises: a first shield comprising a single, first layer, wherein the first layer has a first thickness and a first height; a sensor disposed on the first shield, wherein the sensor is a dual free layer sensor; and a second shield disposed on the sensor, wherein the second shield comprises a plurality of layers, wherein the plurality of layers has a second thickness and a second height, and wherein the first thickness is different from the second thickness, and wherein a ratio of the first thickness to the first height is substantially identical to a ratio of the second thickness to the second height. Out of plane magnetic fields from the first shield and the second shield are substantially cancelled. A magnetic saturation field of the first shield is substantially identical to a magnetic saturation field of the second shield. The sensor is a single free layer sensor. When the sensor is a dual free layer sensor, the magnetic read head further comprises a magnetic hard bias structure disposed behind the sensor and between the first shield and the second shield. A magnetic media drive comprising the magnetic read head is also disclosed.

By using shields having different materials, different number of layers, fabricated by different processes, and or having different heights and thicknesses, keeping the ratio of the thickness to the height for the shields to be substantially identical ensures that the saturation field are substantially identical and balanced.

While the foregoing is directed to embodiments of the present disclosure, other and further embodiments of the disclosure may be devised without departing from the basic scope thereof, and the scope thereof is determined by the claims that follow.

What is claimed is:

1. A magnetic read head, comprising:
   a first shield, wherein the first shield comprises one or more first shield layers, each of the one or more first shield layers having a first height;
   a sensor disposed on the first shield; and
   a second shield disposed on the sensor, wherein the second shield comprises one or more second shield layers, each of the one or more second shield layers having a second height different than the first height, wherein one or more of the first shield and the second shield comprises a plurality of layers, and wherein the first shield and the second shield have substantially identical magnetic saturation fields.

2. The magnetic read head of claim 1, wherein the sensor is a single free layer sensor.

3. The magnetic read head of claim 2, wherein the second shield comprises the plurality of layers, and wherein at least one layer of the plurality of layers of the second shield is formed by a method that is different from a method used to form the first shield.

4. The magnetic read head of claim 1, wherein the first shield comprises a first material, wherein the second shield comprises a second material that is different from the first material.

5. The magnetic read head of claim 1, wherein the first shield has a first thickness, wherein the second shield has a second thickness, and wherein the first thickness is different from the second thickness.

6. The magnetic read head of claim 5, wherein a ratio of the first thickness to the first height is substantially identical to a ratio of the second thickness to the second height.

7. The magnetic read head of claim 1, further comprising a magnetic hard bias structure disposed between the first shield and the second shield.

8. A magnetic media drive comprising the magnetic read head of claim 1.

9. A magnetic read head, comprising:
   a first shield, wherein the first shield comprises a plurality of first shield layers each comprising a same material, each of the plurality of first shield layers being disposed in contact with an adjacent first shield layer, wherein the first shield has a first height;
   a sensor disposed on the first shield; and
   a second shield disposed on the sensor, wherein the second shield comprises one or more second shield layers, wherein the first shield and the second shield have substantially identical magnetic saturation fields, and wherein the second shield has a second height different than the first height.

10. The magnetic read head of claim 9, wherein the plurality of first shield layers comprises amorphous magnetic alloys.

11. The magnetic read head of claim 9, wherein the plurality of first shield layers comprises materials selected from the group consisting of nickel, iron, cobalt, chromium, zirconium, niobium, hafnium, and combinations thereof.

12. The magnetic read head of claim 9, wherein a ratio of a first thickness of the first shield to the first height of the first shield is equal to a ratio of a second thickness of the second shield to the second height of the second shield.

13. A magnetic media drive comprising the magnetic read head of claim 9.

14. A magnetic read head, comprising:
   a first shield, wherein the first shield comprises one or more first shield layers, the first shield having a first height;
   a sensor disposed on the first shield; and
   a second shield disposed on the sensor, wherein the second shield comprises a plurality of second shield layers each comprising a same material, each of the plurality of second shield layers being disposed in contact with an adjacent second shield layer, wherein the first shield and the second shield have substantially identical magnetic saturation fields, and wherein the second shield has a second height different than the first height.

15. The magnetic read head of claim 14, wherein $T_1$ is the first thickness of the first shield, wherein $H_1$ is a height of the first shield, wherein $Ms_1$ is a magnetic moment of the first shield, wherein $T_2$ is a thickness of the second shield, wherein $H_2$ is the second height of the second shield, wherein $Ms_2$ is a magnetic moment of the second shield, and wherein $Ms_1 T_1 / H_1 = Ms_2 T_2 / H_2$.

16. The magnetic read head of claim 15, wherein the first shield and the second shield have different materials.

17. A magnetic media drive comprising the magnetic read head of claim 14.

18. A magnetic read head, comprising:
a first shield, wherein the first shield comprises a plurality of first shield layers;
a sensor disposed on the first shield; and
a second shield disposed on the sensor, wherein:
   the second shield comprises one or more second shield layers,
   the first shield and the second shield have substantially identical magnetic saturation fields,
   a ratio of a first thickness of the first shield to a first height of the first shield is equal to a ratio of a second thickness of the second shield to a second height of the second shield, and the first thickness is different from the second thickness.

19. A magnetic read head, comprising:
a first shield, wherein the first shield comprises a plurality of first shield layers;
a sensor disposed on the first shield; and
a second shield disposed on the sensor, wherein:
   the second shield comprises one or more second shield layers,
   the first shield and the second shield have substantially identical magnetic saturation fields,
   a ratio of a first thickness of the first shield to a first height of the first shield is equal to a ratio of a second thickness of the second shield to a second height of the second shield, and the first thickness is different from the second thickness, and
   a material of the first shield is different from a material of the second shield.

20. A magnetic read head, comprising:
a first shield, wherein the first shield comprises one or more first shield layers;
a sensor disposed on the first shield; and
a second shield disposed on the sensor, wherein:
   the second shield comprises a plurality of second shield layers,
   the first shield and the second shield have substantially identical magnetic saturation fields,
   $T_1$ is a thickness of the first shield,
   $H_1$ is a height of the first shield,
   $Ms_1$ is a magnetic moment of the first shield, wherein
   $T_2$ is a thickness of the second shield,
   $H_2$ is a height of the second shield,
   $Ms_2$ is a magnetic moment of the second shield,
   $Ms_1 T_1 / H_1 = Ms_2 T_2 / H_2$, and
   $H_1$ and $H_2$ are different.

* * * * *